United States Patent
Merulla

(10) Patent No.: US 12,084,111 B2
(45) Date of Patent: Sep. 10, 2024

(54) MOTOR VEHICLE PROVIDED WITH A REINFORCING STRUCTURE

(71) Applicant: FERRARI S.P.A., Modena (IT)

(72) Inventor: Andrea Merulla, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/462,978

(22) Filed: Sep. 7, 2023

(65) Prior Publication Data

US 2024/0083507 A1    Mar. 14, 2024

(30) Foreign Application Priority Data

Sep. 12, 2022   (IT) .................. 102022000018501

(51) Int. Cl.
  *B62D 21/11*   (2006.01)
  *B62D 27/04*   (2006.01)
  *B62D 27/06*   (2006.01)

(52) U.S. Cl.
  CPC .............. *B62D 21/11* (2013.01); *B62D 27/04* (2013.01); *B62D 27/065* (2013.01)

(58) Field of Classification Search
  CPC ...... B62D 21/11; B62D 27/04; B62D 27/065; B62D 21/155
  See application file for complete search history.

(56) References Cited

U.S. PATENT DOCUMENTS

| 4,723,791 A | * | 2/1988 | Miura ...................... B60G 7/02 267/257 |
| 5,074,374 A | * | 12/1991 | Ohtake ................... F16F 15/04 180/300 |
| 5,280,957 A | * | 1/1994 | Hentschel ................ B62D 3/12 280/124.109 |

(Continued)

FOREIGN PATENT DOCUMENTS

| CN | 104520172 A | 4/2015 |
| EP | 1837268 A2 | 9/2007 |

OTHER PUBLICATIONS

Italian Search Report for Application No. 102022000018501, Filing Date: Sep. 12, 2022; Date of Mailing: Apr. 23, 2023, 8 pages.

*Primary Examiner* — Timothy Wilhelm

(74) *Attorney, Agent, or Firm* — CANTOR COLBURN LLP

(57) ABSTRACT

A motor vehicle provided with a frame, a plurality of wheels and suspensions supporting the wheels at variable relative distances with respect to the frame. The motor vehicle defines a front portion and a rear portion with respect to an advancement direction of the motor vehicle, which are opposite to each other along a longitudinal axis of the motor vehicle. The frame comprises, in turn, a first body arranged on the side of the front portion and a second body arranged on the side of the rear portion. The motor vehicle further comprises a subframe, to which at least some of the suspensions are attached and which is fixed to the second body (Continued)

through the interposition of elastic insulator elements at a plurality of fixing points. The motor vehicle further comprises a reinforcing structure attached to the frame. The subframe is operatively interposed between the frame and the reinforcing structure and in contact with the frame and the reinforcing structure.

9 Claims, 4 Drawing Sheets

(56) References Cited

U.S. PATENT DOCUMENTS

| | | | | |
|---|---|---|---|---|
| 5,833,026 | A * | 11/1998 | Zetterstrom | B60G 3/202 |
| | | | | 280/124.135 |
| 5,879,026 | A * | 3/1999 | Dostert | B60G 99/004 |
| | | | | 180/311 |
| 6,428,046 | B1 * | 8/2002 | Kocer | B62D 21/11 |
| | | | | 180/311 |
| 6,866,295 | B2 * | 3/2005 | Ziech | B60G 11/28 |
| | | | | 280/124.109 |
| 7,461,850 | B2 * | 12/2008 | Kurth | B62D 21/155 |
| | | | | 280/124.109 |
| 7,926,846 | B2 * | 4/2011 | Tanaka | B60G 7/02 |
| | | | | 280/781 |
| 8,025,313 | B2 * | 9/2011 | Tanaka | B62D 21/11 |
| | | | | 180/311 |
| 8,402,878 | B2 * | 3/2013 | Schreiner | F41H 5/026 |
| | | | | 89/918 |
| 8,579,308 | B2 * | 11/2013 | Weeks | B60G 3/20 |
| | | | | 280/124.109 |
| 8,746,718 | B2 * | 6/2014 | Otani | B60G 7/02 |
| | | | | 280/124.109 |
| 8,875,834 | B1 * | 11/2014 | Sirbu | B62D 21/10 |
| | | | | 280/124.109 |
| 8,925,942 | B2 * | 1/2015 | Buschjohann | B62D 29/005 |
| | | | | 280/124.109 |
| 9,045,170 | B2 * | 6/2015 | Rumpel | B62D 25/08 |
| 9,108,681 | B2 * | 8/2015 | Imanishi | B62D 29/008 |
| 9,221,317 | B1 * | 12/2015 | Li | B62D 27/06 |
| 9,221,496 | B2 * | 12/2015 | Barr | B60K 17/16 |
| 9,254,872 | B2 * | 2/2016 | Otani | B62D 21/155 |
| 9,403,558 | B1 * | 8/2016 | Pohl | B62D 21/11 |
| 9,423,093 | B1 * | 8/2016 | Clark | F21S 43/20 |
| 9,428,222 | B2 * | 8/2016 | Kramer | B62D 65/00 |
| 9,469,344 | B2 * | 10/2016 | Haselhorst | B62D 21/11 |
| 9,505,437 | B2 * | 11/2016 | Leibl | B62D 21/03 |
| 9,505,438 | B2 * | 11/2016 | Zander | B62D 21/11 |
| 9,540,046 | B2 * | 1/2017 | Kramer | B60G 11/181 |
| 9,937,961 | B2 * | 4/2018 | Lee | B29C 70/80 |
| 10,118,643 | B2 * | 11/2018 | Komiya | B62D 21/11 |
| 10,501,123 | B2 * | 12/2019 | Svacha | B62D 33/077 |
| 10,676,133 | B2 * | 6/2020 | Komiya | B62D 21/11 |
| 11,161,407 | B2 * | 11/2021 | Coffman | B62D 65/10 |
| 11,814,100 | B2 * | 11/2023 | Waghmare | B62D 21/155 |
| 2013/0181476 | A1 * | 7/2013 | Naoi | B62D 29/005 |
| | | | | 296/180.1 |
| 2013/0285416 | A1 * | 10/2013 | Fukushi | B62D 25/20 |
| | | | | 296/204 |
| 2018/0265135 | A1 * | 9/2018 | Komiya | B60R 19/34 |
| 2022/0041055 | A1 | 2/2022 | Pezzati et al. | |
| 2022/0048569 | A1 | 2/2022 | Hair et al. | |

* cited by examiner

MOTOR VEHICLE PROVIDED WITH A REINFORCING STRUCTURE

CROSS-REFERENCE TO RELATED APPLICATIONS

This patent application claims priority from Italian patent application no. 102022000018501 filed on Sep. 12, 2022, the entire disclosure of which is incorporated herein by reference.

TECHNICAL FIELD

The present invention concerns a motor vehicle provided with a reinforcing structure.

BACKGROUND

The frame of a motor vehicle is the supporting structure to which all the components of the motor vehicle are directly or indirectly fixed. More specifically, the engine, which can be an internal combustion engine or an electric motor, and the suspensions, which support the wheels, are fixed to the frame.

In order to increase the comfort of the passenger compartment occupants, transmission towards the frame of the vibrations generated by rolling of the wheels on the road surface must be minimized. For this reason, mounting of the rear suspensions on a rear subframe, which is fixed to the frame by the interposition of elastic insulator elements, for example rubber blocks, has been proposed. Said elastic insulator elements insulate the frame from the rear subframe in terms of vibrations.

In other words, the vibrations that are generated by rolling of the wheels on the road surface are transmitted to the rear subframe (to which the rear suspensions are directly constrained) but are not transmitted (or only minimally transmitted) by the rear subframe to the frame thanks to interposition of the elastic insulator elements.

This solution has proved to be very effective in reducing the level of vibrations transmitted to the frame and therefore perceived by the occupants of the passenger compartment.

In order to allow housing of the subframe, the geometry of the frame must be such as to guarantee sufficient space for the shaking of the subframe. For example, said portion is concave in the shape of a "C" in a lateral view of the vehicle.

However, said conformation of the frame significantly affects structural efficiency in terms of static, torsional and flexional rigidities, and frequency response of the structure.

In the light of the above, the need is therefore felt to improve the known motor vehicles, in order to obtain damping of the vibrations due to rolling on the road surface, maintaining a high structural efficiency of the frame.

An object of the invention is to respond to the above need, preferably in a simple reliable manner.

DESCRIPTION OF THE INVENTION

The object is achieved by a motor vehicle as defined in claim 1.

The dependent claims define particular embodiments of the invention.

BRIEF DESCRIPTION OF THE DRAWINGS

The present invention will now be described with reference to the attached drawings, which illustrate a non-limiting embodiment example thereof, in which.

PREFERRED EMBODIMENTS OF THE INVENTION

Figure 1:
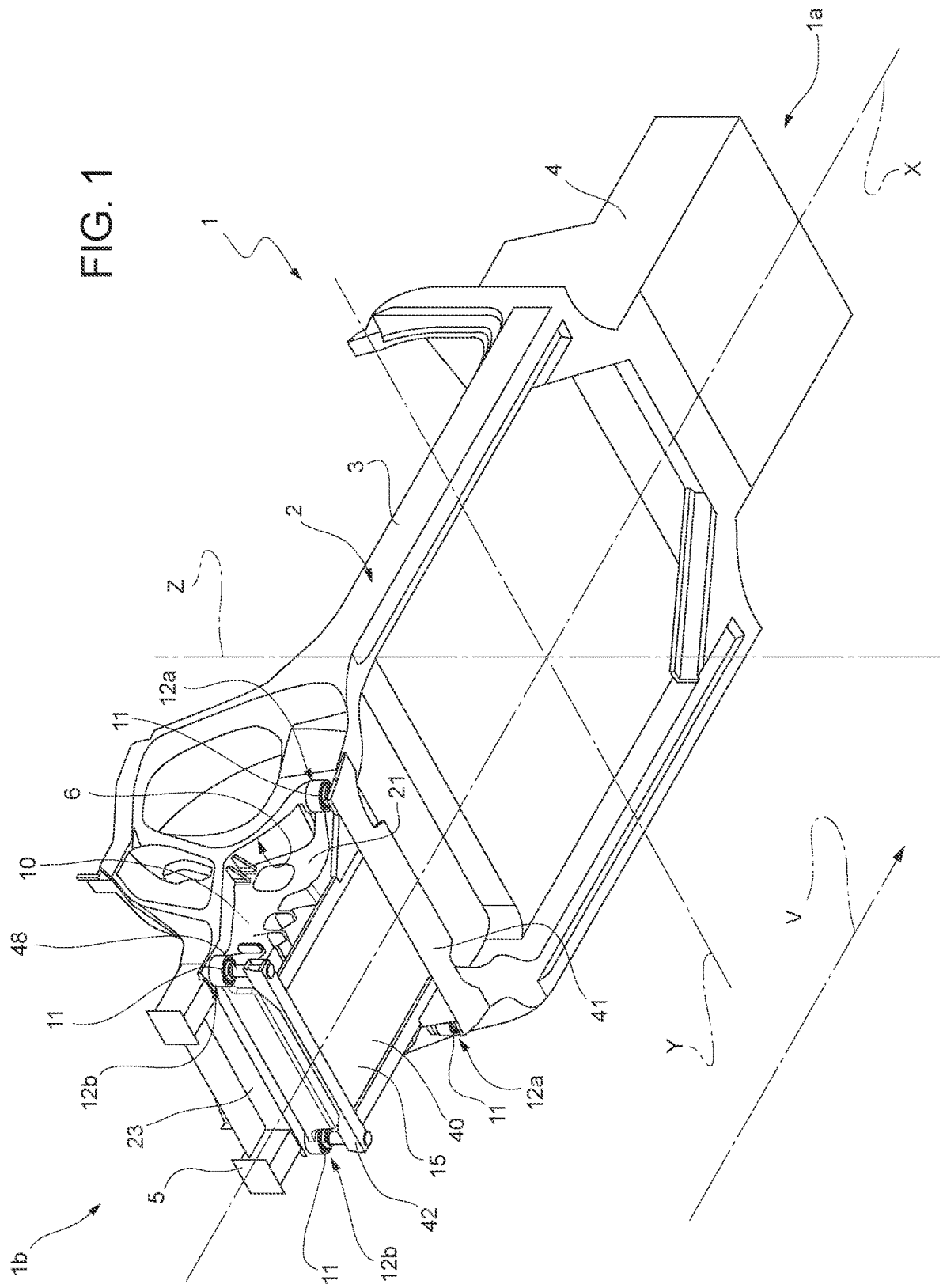
FIG. 1 is a schematic perspective view from below of a motor vehicle according to the present invention, with parts removed for clarity.

In FIG. 1, the number 1 indicates overall a motor vehicle comprising a frame 2 and a plurality of wheels—not illustrated—rotatable relative to the frame 2 around respective rotation axes and adapted to move the frame 2 relative to the ground.

The motor vehicle 1 defines an integral reference system originating in the centre of gravity of the motor vehicle 1 and comprising (FIG. 1):
a longitudinal axis X;
an axis Y orthogonal to the axis X; and
an axis Z orthogonal to the axes X and Y and vertical, in use.

The motor vehicle 1 furthermore defines a front portion 1a and a rear portion 1b, which are opposite to each other along the longitudinal axis X. In the following description, the adjectives "front" and "rear" shall be understood relative to an advancement direction V of the motor vehicle 1 oriented from the rear portion 1b towards the front portion 1a (FIG. 1).

In greater detail, the motor vehicle 1 comprises two front wheels arranged at the front portion 1a and two rear wheels arranged at the portion 1b.

The motor vehicle 1 further comprises:
a plurality of suspensions—not illustrated—that support the wheels at variable relative distances from the frame 2 along the axis Z; and
a subframe 10, to which at least some of the suspensions are fixed and which is fixed to the frame 2 by the interposition of elastic insulator elements 11.

As illustrated in FIG. 1, the frame 2 comprises:
a central body 3, at which a passenger compartment of the motor vehicle 1 is defined;
a front body 4 arranged on the side of the front portion 1a, which supports the front wheels; and
a rear body 5 on the side of the rear portion 1b, which supports the rear wheels.

The rear body 5 comprises, in turn, a concave portion 6 adapted to be facing the ground on which the wheels of the motor vehicle 1 rest and at which the subframe 10 is at least partially housed. In the embodiment shown, the concave portion 6 has a C-shaped cross section in a plane passing through the axes X and Z (FIG. 1).

The subframe 10 is fixed to the rear body 5 of the frame 2 at a plurality of fixing points 12a, 12b. In the embodiment illustrated, there are four fixing points 12a, 12b (FIG. 1).

Figure 4:
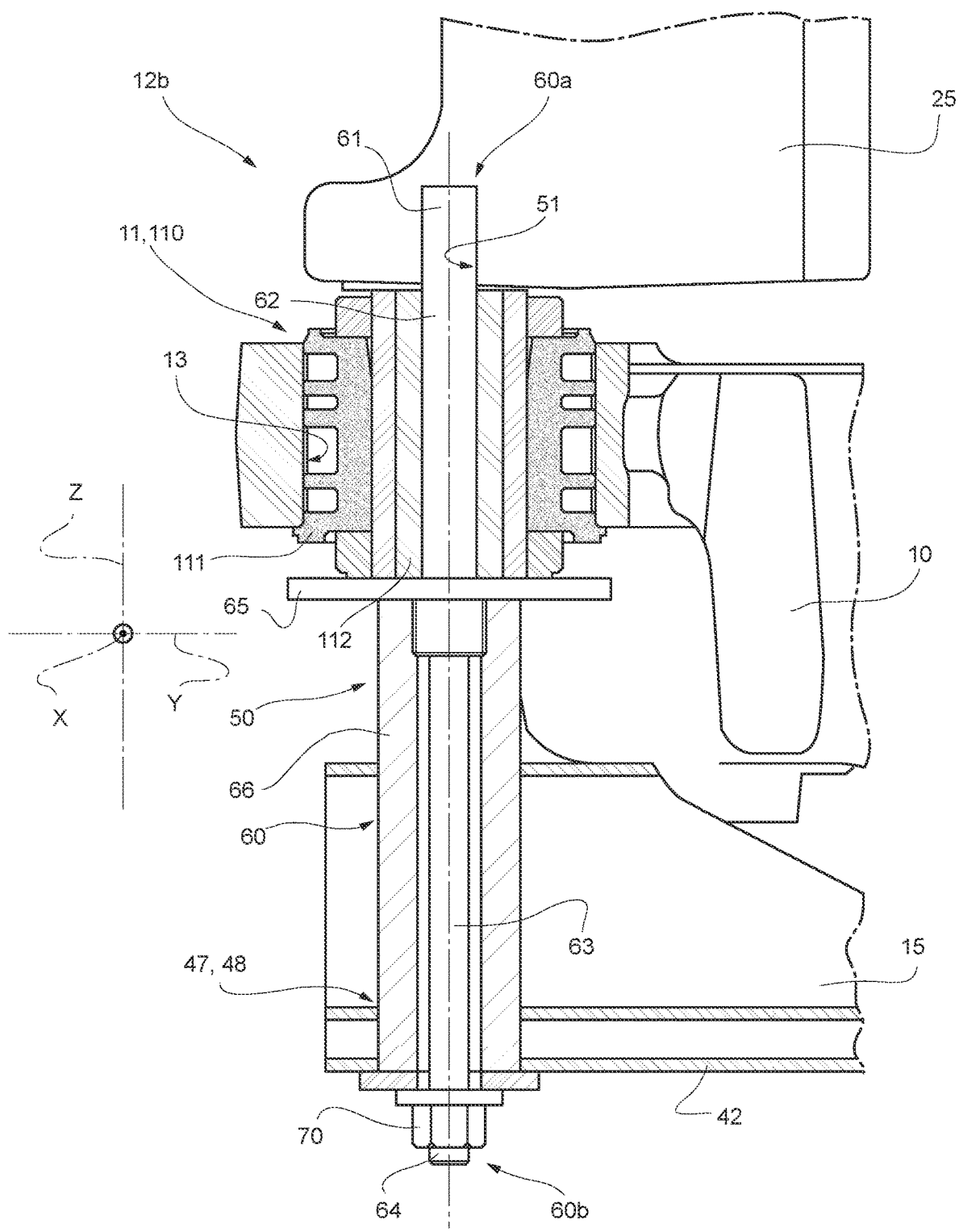
FIG. 4 is a partial section on an enlarged scale along the line IV-IV in FIG. 2.

In detail, the subframe 10 comprises a through hole 13 at each of the fixing points 12a, 12b and the elastic insulator elements 11 comprise elastic bushings 110 each housed at a respective hole 13 (FIG. 4).

Each elastic bushing 110 in turn comprises:
a deformable cylindrical portion 111, for example made of rubber, positioned in contact with the inner walls of the relative hole 13; and a cylindrical portion 112, preferably made of metal and arranged in a radially internal manner with respect to the cylindrical portion 111.

The cylindrical portions 111 and 112 are arranged coaxially to each other. Furthermore, the axis of the elastic bushings 110 is arranged parallel to the axis Z (FIG. 4).

In further detail, the subframe 10 comprises two front fixing points 12a arranged on the side of the front portion 1a and two rear fixing points 12b arranged on the side of the rear portion 1b.

It is also possible to define a median plane M of the subframe along the axis Y directed parallel to the longitudinal axis X, which divides the subframe 10 into two halves 10a and 10b. Each of the two halves 10a, 10b comprises a front fixing point 12a and a rear fixing point 12b spaced from each other with respect to the longitudinal axis X (FIG. 2).

In detail, the front fixing point 12a and the rear fixing point 12b of one of the two halves 10a, 10b are arranged symmetrically to the front fixing point 12a and to the rear fixing point 12b of the other of the two halves 10b, 10a with respect to the median plane M.

In greater detail, the front fixing points 12a are aligned with each another along a direction I parallel to the axis Y.

Figure 2:
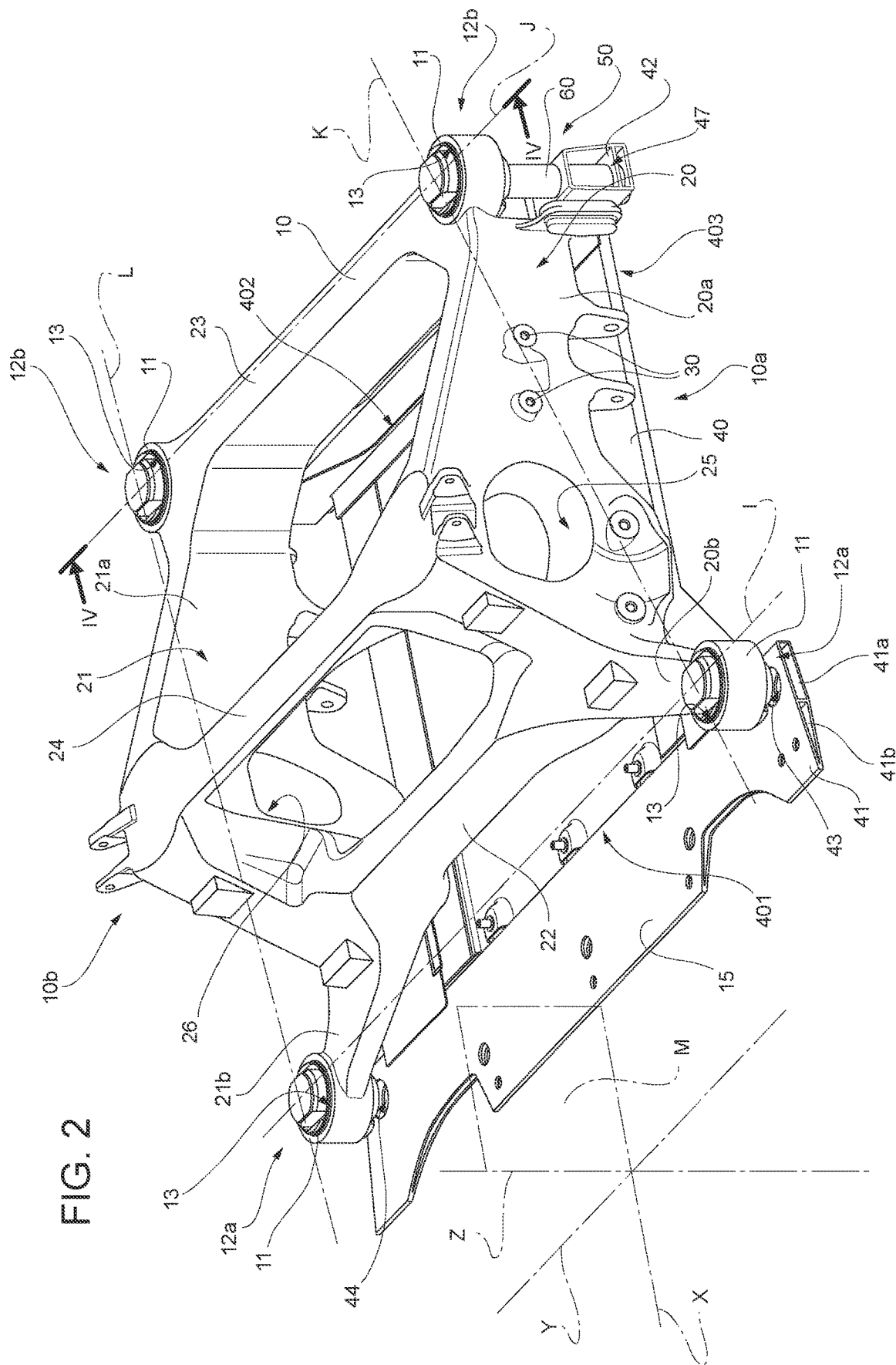
FIG. 2 is a perspective view of two components of the motor vehicle illustrated in FIG. 1.

Analogously, the rear fixing points 12b are aligned with each another in a direction J parallel to the axis Y and to the direction I (FIG. 2).

The front fixing point 12a and the rear fixing point 12b of each of the two halves 10a, 10b, furthermore, are aligned with each other in respective directions K, L transverse to the longitudinal axis X and incident to each other.

In other words, the fixing points 12a and 12b are arranged at respective vertexes of an isosceles trapezium.

Furthermore, the front fixing points 12a are arranged at a same first coordinate relative to the axis Z and the rear fixing points 12b are arranged at a same second coordinate relative to the axis Z. In particular, the front fixing points 12a are arranged below the rear fixing points 12b. In other words, the front fixing points 12a are adapted to be closer to the ground than the rear fixing points 12b.

The subframe 10 further comprises (FIG. 2):
a body 20, which joins a front fixing point 12a to the respective rear fixing point 12b aligned with each other in the direction K;
a body 21, which joins a front fixing point 12a to the respective rear fixing point 12b aligned with each other in the direction L; and
two cross members 22, 23, which join the bodies 20 and 21 to each other and which extend crosswise thereto.

In particular, the body 20 is arranged on the side of the half 10a and the body 21 is arranged on the side of the half 10b.

The cross members 22 and 23 are spaced from each other along the longitudinal axis X and extend parallel to each other and to the axis Y.

In detail, the cross member 23 extends in the direction J and joins the rear fixing points 12b. The cross member 22 is spaced from the front fixing points 12a along the longitudinal axis X towards the rear fixing points 12b.

In further detail, in a plane orthogonal to the axis Y, the cross sections of the cross members 22 and 23 have a rectangular shape.

Preferably, furthermore, the cross members 22 and 23 are aligned or substantially aligned with each other with respect to the axis Z. In particular, the upper surfaces—namely the surfaces that are opposite the ground—of the cross members 22 and 23 are coplanar or substantially coplanar.

The body 20 comprises, in turn:
a portion 20a, having triangular or substantially triangular shape in a plane orthogonal to axis Y, which extends between the cross member 22 and the rear fixing point 12b arranged at the half 10a; and
an arm 20b, which extends between the cross member 22 and the front fixing point 12a arranged at the half 10a.

The portion 20a extends parallel or substantially parallel to the longitudinal axis X, while the arm 20b is directed crosswise to the longitudinal axis X.

Analogously to the body 20, the body 21 comprises:
a portion 21a, having triangular or substantially triangular shape in a plane orthogonal to axis Y, which extends between the cross member 22 and the rear fixing point 12b arranged at the half 10b; and
an arm 21b, which extends between the cross member 22 and the front fixing point 12a arranged at the half 10b.

The portion 21a extends parallel or substantially parallel to the longitudinal axis X, while the arm 21b is directed crosswise to the longitudinal axis X.

Proceeding along the longitudinal axis X in the direction oriented from rear portion 1b to front portion 1a, the distance between corresponding points of arm 20b and arm 21b parallel to axis Y progressively increases. In other words, proceeding along the longitudinal axis X in the direction oriented from rear portion 1b to front portion 1a, arms 20b and 21b diverge from the cross member 22.

The portions 20a and 21a comprise, in turn, respective openings 25, 26 arranged symmetrically or substantially symmetrically to each other with respect to the median plane M. Specifically, the openings 25 and 26 are crossed by the axle shafts of the rear wheels, not illustrated.

In the embodiment illustrated, the subframe 10 also comprises a cross member 24, which joins the bodies 20 and 21 to each other and extends crosswise thereto. The cross member 24 is furthermore arranged above the cross members 22 and 23, namely it is more spaced from the ground on which the wheels rest than the cross members 22 and 23.

The cross member 24 extends parallel to the Y axis and to the cross members 22 and 23. Furthermore, the cross member 24 joins the upper vertexes of the triangular shapes of the portions 20a and 21a.

Furthermore, the subframe 10 comprises a plurality of coupling elements 30 (FIGS. 2 and 3) configured to allow the coupling of one or more rear suspensions, namely the suspensions that indirectly connect the rear wheels to the frame 2. In particular, the levers of said rear suspensions are connected only to the subframe 10 and do not have any direct connection to the rear body 5 of the frame 2.

Preferably, the coupling elements 30 are arranged at the portions 20a and 21a (FIG. 2).

Advantageously, the motor vehicle 1 comprises a reinforcing structure 15 directly fixed to the frame 2;
the subframe 10 is operatively interposed between the frame 2 and the reinforcing structure 15 and in contact with the frame 2 and the reinforcing structure 15, in particular parallel to the axis Z (FIG. 1).

In other words, the subframe 10 is compressed and/or sandwiched for at least part of the extension thereof between frame 2 and reinforcing structure 15.

By the fact that reinforcing structure 15 is directly attached to frame 2, it is meant that reinforcing structure 15 is attached to frame 2 independently of subframe 10.

The motor vehicle 1 further comprises connecting elements 50 adapted to fix the reinforcing structure 15 to the frame 2 and which will be described in detail in the following part of the present description. The frame 2 comprises a plurality of holes 51, which are specifically threaded holes, adapted to be each engaged by a respective connecting element 50.

In detail, the reinforcing structure 15 is directly fixed to the frame 2, at the rear body 5.

In the embodiment illustrated, the reinforcing structure 15 comprises:
  a central plate 40;
  a front body 41 arranged on the side of the front portion 1*a*; and
  a rear body 42 arranged on the side of the rear portion 1*b*.

According to an alternative embodiment not illustrated, the central plate 40, the front body 41 and/or the rear body 42 form a single piece.

Figure 3:
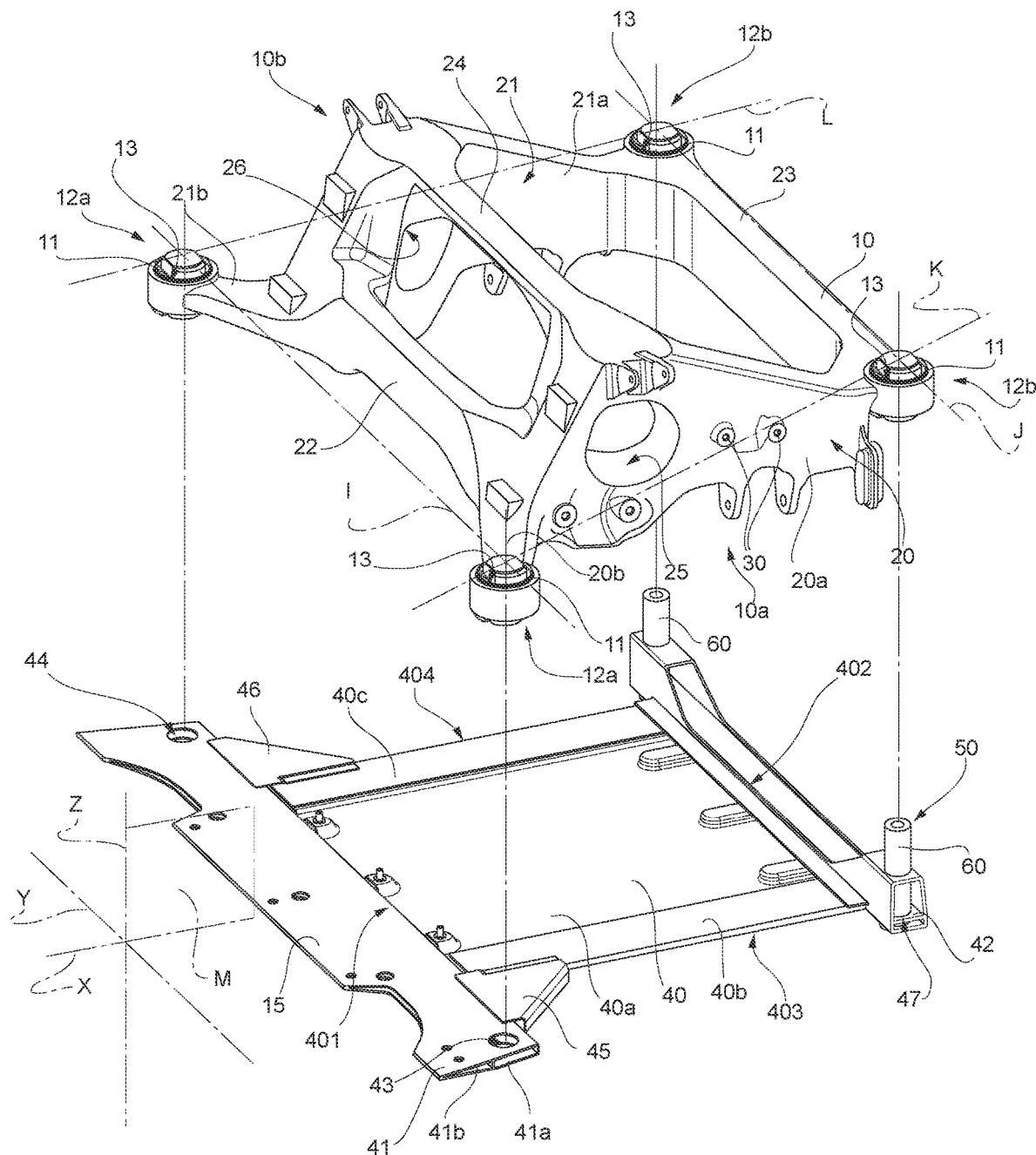
FIG. 3 is an exploded view of the components illustrated in FIG. 2.

As illustrated in FIG. 3, the central plate 40 is rectangular and comprises two sides 401, 402 extending parallel to the axis Y and two sides 403, 404 extending parallel to the axis X.

The central plate 40 further comprises:
  a central portion 40*a*; and
  two reinforcement elements 40*b*, 40*c*, which extend respectively at the sides 403 and 404 along the entire extension of the central portion 40*a* parallel to the axis X.

The front body 41 is fixed to the central plate 40 at the side 401 and comprises two through holes 43, 44 for fixing the reinforcing structure 15 to the frame 2. In detail, the holes 43 and 44 are each aligned with a respective front fixing point 12*a* (namely with a respective hole 13 of the subframe 10) and with a respective hole 51 of the frame 2 parallel to the axis Z.

The holes 43 and 44 are symmetrical to each other with respect to the median plane M and are aligned with each other in a direction parallel to the axis Y.

The extension of the front body 41 parallel to the axis Y is greater than the extension of the central plate 40 along the axis Y. In particular, the front body 41 protrudes parallel to the axis Y with respect to the side 401, both on the side of the half 10*a* and on the side of the half 10*b*.

In further detail, the front body 41 comprises (FIG. 3):
  a first portion 41*a* arranged on the side of the central plate 40 and having rectangular-shaped cross section in a plane orthogonal to the axis Y;
  a second portion 41*b* opposite the central plate 40 relative to the first portion 41*a*.

The first and the second portion 41*a*, 41*b* are arranged in succession along the axis X.

Proceeding along the axis X in the direction oriented from the central plate 40 to the first portion 41*a*, the second portion 41*b* has an extension progressively decreasing parallel to the axis Z.

In further detail, the holes 43 and 44 are arranged at the first portion 41*a*.

The reinforcing structure 15 further comprises two angle elements 45, 46 adapted to fix the front body 41 to the central plate 40 and/or to stiffen the connection between the front body 41 and the central plate 40. In detail, each of the two angle elements 45, 46 is fixed both to the front body 41 and to a respective reinforcing element 40*b*, 40*c*. In greater detail, the angle elements 45, 46 are fixed at the respective portions of the front body 41 which protrude parallel to the axis Y with respect to the central plate 40.

Preferably, furthermore, the reinforcing structure 15 is symmetrical with respect to the median plane M.

The rear body 42 is fixed to the central plate 40 at the side 402 and comprises two through holes 47, 48 for fixing the reinforcing structure 15 to the frame 2.

In detail, the holes 47 and 48 are each aligned with a respective rear fixing point 12*b* (namely with a respective hole 13 of the subframe 10) and with a respective hole 51 of the frame 2 parallel to the axis Z.

The holes 47 and 48 are symmetrical to each other relative to the median plane M and are aligned with each other in a direction parallel to the axis Y. In addition, the axes of the holes 47 and 48 are arranged parallel to the axis Z.

The extension of the rear body 42 parallel to the axis Y is greater than the extension of the central plate 40 parallel to the axis Y, but smaller than the extension of the front body 41 parallel to the axis Y. In particular, the rear body 42 protrudes parallel to the axis Y with respect to the side 402 both on the side of the half 10*a* and on the side of the half 10*b*.

The connecting elements 50 are described below in greater detail. In particular, each connecting element 50 engages at the same time a respective hole 43, 44, 47, 48 of the reinforcing structure 15, a respective hole 13 of the subframe and a respective hole 51 of the frame 2. In further detail, each connecting element 50 engaging the respective hole 13 engages a respective elastic bushing 110 housed therein.

Specifically, each connecting element 50 comprises a screw 60 (only two of which are shown in FIG. 3) defining an axial end 60*a* arranged on the side of the frame 2 and an axial end 60*b* opposite the axial end 60*a* and arranged on the side of the reinforcing structure 15 (FIG. 4).

Proceeding from the axial end 60*a* to the axial end 60*b*, each screw 60 comprises along its longitudinal axis:
  a stretch 61, which is threaded in particular, which engages a respective hole 51 of the frame 2;
  a stretch 62, which engages a respective elastic bushing 110;
  a stretch 63, which engages the reinforcing structure 15; and
  a stretch 64, which is threaded in particular, which protrudes beyond the reinforcing structure 15 on the side opposite the frame 2.

Each connecting element 50 further comprises a nut 70 engaged with the screw 60 at the stretch 64.

In detail, each screw 60 also comprises a shoulder 65 axially interposed between the stretch 62 and the stretch 63. In greater detail, each elastic bushing 110 is positioned in abutment against the shoulder 65 of the respective screw 60 on the side of said shoulder 65 facing the frame 2.

In the embodiment shown, each screw 60 also comprises a spacer 66 at the stretch 63, arranged concentrically and radially external to the stretch 63.

In the light of the above, connecting elements 50 are adapted to fix reinforcing structure 15 to frame 2 independently of subframe 10. In detail, connecting elements 50 would fix reinforcing structure 15 to frame 2 even in the absence of subframe 10.

It should be noted that during assembly of the motor vehicle 1 it is necessary to preliminarily fix the subframe 10 to the rear body 5 of the frame 2 at the four fixing points 12*a*, 12*b* in the absence of the reinforcing structure 15, and therefore fix the reinforcing structure 15 directly to the rear body 5 of the frame 2 by means of the connecting elements 50. Analogously, in the case of disassembly of the motor vehicle 1 it is necessary to preliminarily unscrew the connecting elements 50 and remove the reinforcing structure 15 before the subframe 10 can be removed from the rear body 5 of the frame 2.

The operation of the motor vehicle 1 according to the present invention is described below.

In use, the wheels rotate around the respective rotation axes, determining the movement of the frame 2 with respect to the ground.

During rolling of the wheels, vibrations are generated due to the irregularities of the road surface. Said vibrations are transmitted to the subframe 10 by means of the rear suspensions, but are not transmitted (or only minimally transmitted) from the subframe 10 to the frame 2 due to the interposition of the elastic insulator elements 11.

During operation of the vehicle 1, the subframe 10 is interposed between the frame 2 and the reinforcing structure 15, which is in turn directly fixed to the frame 2.

From the above, the advantages of the vehicle 1 according to the invention are evident.

In particular, since the vehicle 1 comprises the reinforcing structure 15, which is directly fixed to the frame 2, and since the subframe 10 is interposed between the frame 2 and the reinforcing structure 15, it is possible to damp the vibrations due to rolling on the road surface while maintaining a high structural efficiency of the frame 2. Specifically, the rigidity of the frame 2 is increased by the presence of the reinforcing structure 15.

In fact, although the subframe 10 is elastically fixed to the frame 2, the reinforcing structure 15 limits the shaking thereof.

Lastly, it is clear that modifications and variations that do not depart from the protective scope defined by the claims can be made to the motor vehicle 1 according to the invention.

The invention claimed is:

1. Motor vehicle (1) comprising:
a frame (2);
a plurality of wheels rotatable with respect to said frame (2) about respective rotational axes;
a plurality of suspensions supporting said wheels (2) at variable relative distances with respect to said frame (2);
said motor vehicle (1) defining a front portion (1a) and a rear portion (1b) with respect to an advancement direction (V) of said motor vehicle (1); said front portion (la) and said rear portion (1b) being opposite to each other along a longitudinal axis (X) of said motor vehicle (1);
said frame (2) comprising a first body (4) arranged on said front portion (la) and a second body (5) arranged on said rear portion (1b);
said motor vehicle (1) further comprising a subframe (10), to which at least some of said suspensions are attached; said subframe (10) being fixed to said second body (5) through the interposition of elastic insulator elements (11) at a plurality of fixing points (12a, 12b); and
a reinforcing structure (15) directly attached to said frame (2) wherein said reinforcing structure (15) comprises a central plate (40); a third body (41) arranged on said front portion (la); and a fourth body (42) arranged on said rear portion (1b); said third body (41) comprising at least a first hole (43, 44) and said fourth body (42) comprising at least a second hole (47, 48); said first hole (43, 44) and said second hole (47, 48) being each aligned to a respective said fixing point (12a, 12b);
said subframe (10) being operatively interposed between said frame (2) and said reinforcing structure (15) and in contact with said frame (2) and said reinforcing structure (15).

2. Motor vehicle according to claim 1, wherein said third body (41) comprises:

a first portion (41a) arranged on said central plate (40) and having a rectangular-shaped cross section in a plane orthogonal to a second axis (Y) orthogonal to said longitudinal axis (X);
a second portion (41b) opposite to said central plate (40) with respect to said first portion (41a);
said first and second portion (41a, 41b) being arranged in succession along said longitudinal axis (X);
said second portion (41b) having progressively decreasing extension parallel to a third axis (Z) orthogonal to said longitudinal axis (X) and to said second axis (Y), proceeding along said longitudinal axis (X) in the direction oriented from said central plate (40) to said first portion (41a).

3. Motor vehicle according to claim 2, wherein said first hole (43, 44) is arranged at said first portion (41a).

4. Motor vehicle according to claim 1, wherein said reinforcing structure (15) is symmetrical with respect to a median plane (M) parallel to said longitudinal axis (X).

5. Motor vehicle according to claim 4, wherein said subframe (10) comprises two front fixing points (12a) arranged on said front portion (la) and two rear fixing points (12b) arranged on the side of said rear portion (1b);
said front fixing points (12a) being aligned to one another along a first direction (I) orthogonal to said longitudinal axis (X); said rear fixing points (12b) being aligned to one another along a second direction (J) parallel to said first direction (I);
said front fixing points (12a) being distanced from said rear fixing points (12b) parallel to said longitudinal axis (X);
wherein one of the two front fixing points (12a) is aligned along a third direction (K) to a respective rear fixing point (12b) arranged at a first half (10a) of said subframe (10) with respect to said median plane (M);
wherein the other of the two front fixing points (12a) is aligned along a fourth direction (L) to a respective rear fixing point (12b) arranged at a second half (10b) of said subframe (10) with respect to said median plane (M) of said subframe (10);
said third direction (K) and said fourth direction (L) being incident to each other.

6. Motor vehicle according to claim 5, wherein said front fixing point (12a) and said rear fixing point (12b) arranged at said first half (10a) are arranged symmetrically to said front fixing point (12a) and said rear fixing point (12b) arranged at said second half (10b) with respect to said median plane (M).

7. Motor vehicle according to claim 5, wherein said front fixing points (12a) are arranged at a same first coordinate with respect to a third axis (Z) orthogonal to said longitudinal axis (X) and vertical, in use;
said rear fixing points (12b) being arranged at a same second coordinate with respect to said third axis (Z);
said front fixing points (12a) being arranged below said rear fixing points (12b) with respect to the ground on which said motor vehicle (1) rests.

8. Motor vehicle according to claim 1, wherein said frame (2) comprises a plurality of third holes (51) and said subframe (10) comprises a plurality of fourth holes (13);
said fourth holes (13) being each arranged at a respective said fixing point (12a, 12b);
each said elastic insulator element (11) comprising an elastic bushing (110) housed at a respective said fourth hole (13);

said motor vehicle (1) further comprising connection elements (50) for fixing said reinforcing structure (15) to said frame (2);

wherein each said connection element (50) engages one said first hole (43, 44) or one said second hole (47, 48); each said connection element (50) engaging in addition and at the same time one respective said third hole (51) and one respective said elastic bushing (110).

9. Motor vehicle according to claim 8, wherein each said connection element (50) comprises:

a screw (60) defining a first axial end (60*a*) arranged on said frame (2) and a second axial end (60*b*) opposite to said first axial end (60*a*) and arranged on said reinforcing structure (15);

a nut (70);

each said screw (60) comprising, proceeding from said first axial end (60*a*) towards said second axial end (60*b*):

a first threaded stretch (61) engaging a respective third hole (51);

a second stretch (62) engaging a respective said elastic bushing (110);

a third stretch (63) engaging said reinforcing structure (15); and a fourth threaded stretch (64) protruding beyond said reinforcing structure (15) on the side opposite to said frame (2);

said nut (70) engaging said screw (60) at said fourth stretch (64).

* * * * *